(12) United States Patent
Chan

(10) Patent No.: US 6,982,665 B2
(45) Date of Patent: Jan. 3, 2006

(54) SIGNAL FILTERING SYSTEM AND METHOD FOR A COMPUTER SYSTEM REMOTE CONTROLLER

(75) Inventor: Chih-Kai Chan, Taoyuan (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 519 days.

(21) Appl. No.: 10/350,986

(22) Filed: Jan. 24, 2003

(65) Prior Publication Data

US 2004/0090357 A1 May 13, 2004

(30) Foreign Application Priority Data

Nov. 13, 2002 (TW) ................................ 91133233 A

(51) Int. Cl.
*G08C 19/12* (2006.01)

(52) U.S. Cl. ................. 341/176; 341/173; 340/825.69; 340/825.72; 348/734

(58) Field of Classification Search ................. 341/173, 341/176; 348/734; 340/825.69, 825.72
See application file for complete search history.

(56) References Cited

U.S. PATENT DOCUMENTS

| 5,341,316 | A | 8/1994 | Nishigaki | |
|---|---|---|---|---|
| 5,923,866 | A | 7/1999 | Chen | |
| 6,008,777 | A * | 12/1999 | Yiu | 345/2.1 |
| 6,747,590 | B1 * | 6/2004 | Weber | 341/176 |

FOREIGN PATENT DOCUMENTS

JP 05040185 A 2/1993

* cited by examiner

Primary Examiner—Albert K. Wong
(74) Attorney, Agent, or Firm—Quintero Law Office

(57) ABSTRACT

A signal filtering system for a computer system remote controller. The system includes a remote controller, a filtering control enabling unit, and a keyboard encoder. The filtering control enabling unit sets a filtering pin, enabling a keyboard encoder receiving a function signal from the remote controller to filter the signal, selectively transmitting the function signal to a computer system.

13 Claims, 2 Drawing Sheets

SIGNAL FILTERING SYSTEM AND METHOD FOR A COMPUTER SYSTEM REMOTE CONTROLLER

BACKGROUND OF THE INVENTION

1. Field of the Invention

The present invention relates to a signal filtering system and method for remote controller, and particularly to a system and method used in computer systems that employs a keyboard encoder and a filtering pin to filter signals of a remote controller.

2. Description of the Related Art

Most computer systems can integrate practical appliances or functions, for example, CD/MP3 and VCD/DVD player, and TV function can also be integrated. A remote controller can select and operate specific appliances or functions. The computer system can operate in two modes: AV and PC. The computer system can operate normally in the PC mode, and operate as VCD/DVD/TV player in the AV mode.

When in the PC mode, the operating system (OS) can define functions of corresponding keys for respective applications. If the functions of control keys in the remote controller are overlapped with the functions of corresponding keys defined in the computer system, operations in the computer system can be affected and data can be lost if any control key in the remote controller is inadvertently selected.

SUMMARY OF THE INVENTION

It is therefore an object of the present invention to provide a signal filtering system and method for a computer system remote controller that employs a keyboard encoder and a filtering pin to filter remote controller signals.

To achieve the above object, the present invention provides a signal filtering system and method for a computer system remote controller. According to an embodiment of the invention, the system includes a remote controller, a filtering control enabling unit, and a keyboard encoder. The filtering control enabling unit sets a filtering pin. The keyboard encoder receives a function signal from the remote controller, and transmits it to a computer system according to the filtering pin.

According to another embodiment of the invention, a signal filtering method for a computer system remote controller is provided. First, a function signal from a remote controller is received by a keyboard encoder. If enabled by the filtering pin, the keyboard encoder determines whether to transmit the signal to the computer system.

According to the embodiment, the filtering control enabling unit sets the filtering pin to a first value. When the filtering pin is at the first value, the keyboard encoder determines whether the function signal represents a permitted function. If so, the function signal in transmitted to the computer system. Otherwise, the function signal is not transmitted to the computer system.

Further, the filtering control enabling unit can be software-enabled or a manual control built accessibly into the computer system. The filtering pin can be set by employing the software to detect the mode of the computer system, or by selecting (using) the manual control.

BRIEF DESCRIPTION OF THE DRAWINGS

The aforementioned objects, features, and advantages of this invention will become apparent by referring to the following detailed description of the preferred embodiment with reference to the accompanying drawings, wherein.

DETAILED DESCRIPTION OF TED INVENTION

Figure 1:
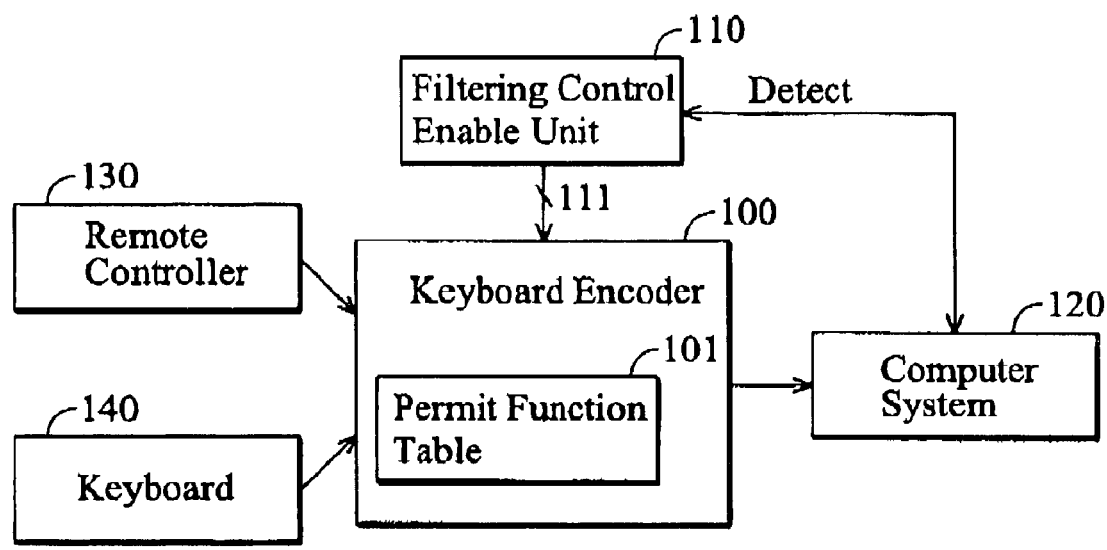
FIG. 1 is a schematic diagram showing the architecture of the signal filtering system for a computer system remote controller according to the embodiment of the present invention.

FIG. 1 shows the architecture of the signal filtering system for a computer system remote controller according to the embodiment of the present invention.

The system includes a keyboard encoder 100, a filtering control enabling unit 110, a computer system 120, a remote controller 130, and a keyboard 140.

The keyboard encoder 100 receives signals (function signals) from the remote controller 130 and/or keyboard 140. The filtering control enabling unit 110 can be a manual control built accessibly into the computer system 120, and users can press the manual control to set a filtering pin 111 to a first value to enable the filtering function on the computer system 120. Further, the filtering control enabling unit 110 can be software-enabled, automatically detecting the system mode of the computer system 120. If the computer system 120 operates in the PC mode, the software sets the filtering pin 111 at the first value. Otherwise, the filtering pin 111 is set at a second value.

In this embodiment, the filtering control enabling unit 110 sets the filtering pin 111 at the first value, such as High, to enable filtering of the signal from the remote controller 130, and at the second value, such as Low, to disable filtering.

The keyboard encoder 100 includes a permit function table 101. The permit function table 101 records the function signals from the remote controller 130 that can be sent to the computer system 120 when the filtering function is enabled. For example, the function signals that can be sent to the computer system 120 can correspond to mode switching controls, such as switching to CD or VCD, and others. Function signals that cannot be sent to the computer system 120 may be function signals corresponding to numeral manual controls, quiet manual control, forwarding manual control, and others.

The keyboard encoder 100 receives the function signals from the remote controller 130 and keyboard 140, and transmits the received function signals to the computer system 120 according to the filtering pin 111. If the filtering pin 111 is at the second value (Low), all of the function signals from the remote controller 130 and keyboard 140 are transmitted to the computer system 120. If the filtering pin ill is at the first value (High), all function signals from the keyboard 140 are transmitted to the computer system 120, while only the function signals recorded in the permit function table 011 are transmitted to the computer system 120.

Figure 2:
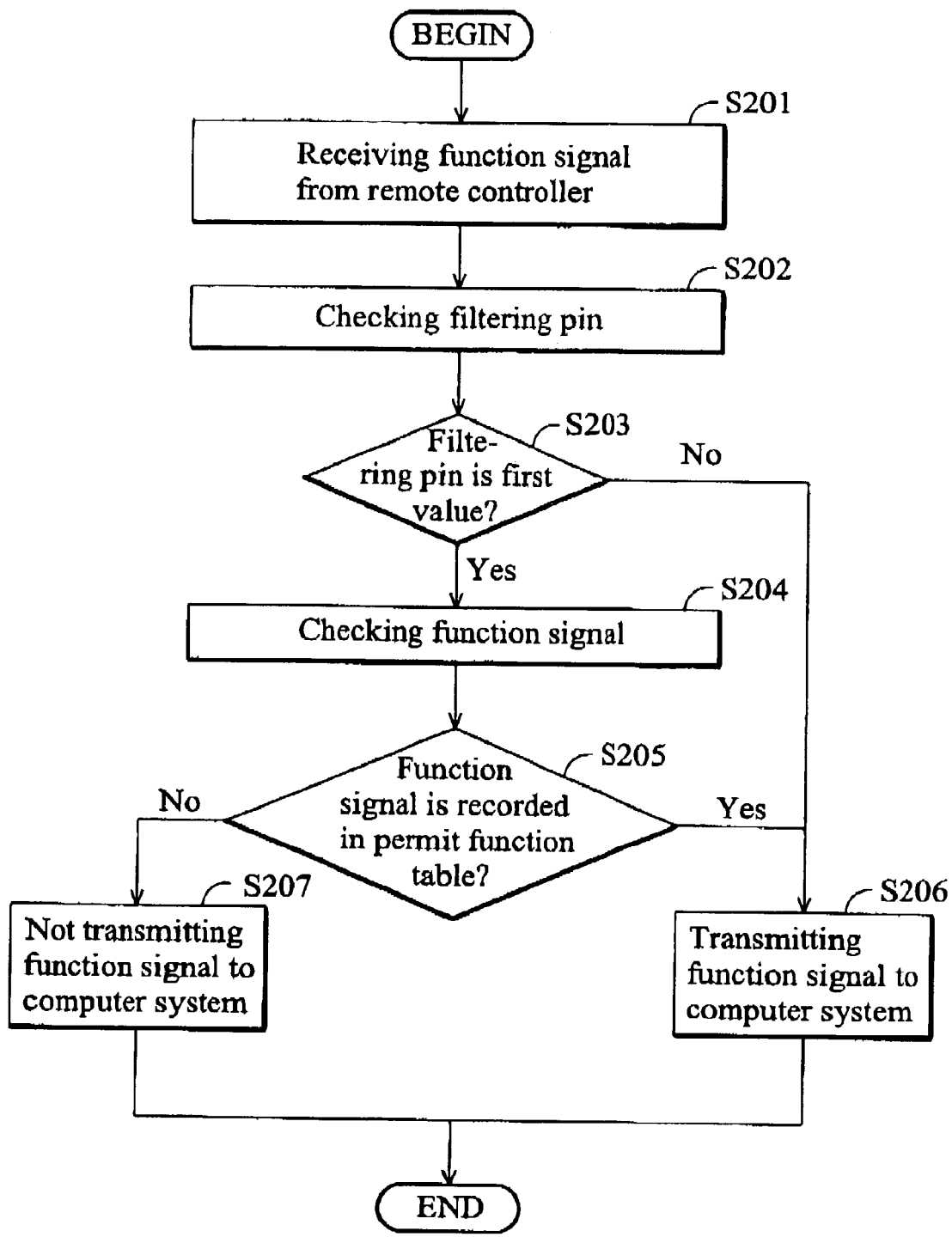
FIG. 2 is a flowchart illustrating the operation of the signal filtering method for a computer system remote controller according to the embodiment of the present invention.

FIG. 2 illustrates the operation of the signal filtering method for a computer system remote controller according to the embodiment of the present invention.

First, in step S201, a function signal from the remote controller 130 is received by the keyboard encoder 100. Then, in step S202, the status of the filtering pin 111 is checked.

If the filtering pin 111 is at the second value (No in step S203), in step S206, the received function signal is transmitted to the computer system 120. If the filtering pin 111 is at the first value (Yes in step S203), in step S204, the keyboard encoder determines if the incoming function signal is recorded in the permit function table 101.

It so, (Yes in step S205), in step S206, the function signal is transmitted to the computer system 120. If the function signal is not recorded in the permit function table 101 (No in step S205), in step S207, the function signal is not transmitted to the computer system 120.

It should be noted that the function signals recorded in the permit function table 101 can be predefined by system administrator or users, and the function signals can be different depending on application. Further, the filtering pin 111 can be set by a manual control built accessibly into the computer system 120, or set by employing software detecting the mode of the computer system 120 to enable the filtering function if the computer system 120 is operating in the PC mode.

As a result, using the signal filtering system and method for a computer system remote controller according to the present invention, the interference from remote controller can be prevented.

Although the present invention has been described in its preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A signal filtering system for a computer system remote controller, comprising:
   a remote controller to send a function signal;
   a filtering control enabling unit to set a filtering pin; and
   a keyboard encoder enabled by the filtering pin to receive function signals sent from the remote controller, and transmit the function signal to a computer system.

2. The system as claimed in claim 1 wherein the filtering control enabling unit sets the filtering pin to a first value.

3. The system as claimed in claim 2 wherein the keyboard encoder filters the function signal when the filtering pin is at the first value, and transmits the function signal to the computer system if the function signal is permitted.

4. The system as claimed in claim 1 wherein the filtering control enabling unit is a manual control on the computer system.

5. The system as claimed in claim 1 wherein the filtering control enabling unit is software-enabled on the computer system.

6. The system as claimed in claim 5 wherein the software detects the mode of the computer system, and sets the filtering pin according to the mode of the computer system.

7. A signal filtering method for a computer system remote controller, comprising:
   receipt of a function signal from a remote controller by a keyboard encoder; and
   transmitting the function signal to a computer system according to a filtering pin.

8. The method as claimed in claim 7 further set the filtering pin by a filtering control enabling unit.

9. The method as claimed in claim 8, further comprising the filtering control enabling unit setting the filtering pin to a first value.

10. The method as claimed in claim 9 further comprising, when the filtering pin is at the first value, the keyboard encoder determining if the function signal is permitted, and, if so, transmitting the function signal to the computer system.

11. The method as claimed in claim 8 wherein the filtering control enabling unit is a manual control on the computer system.

12. The method as claimed in claim 8 wherein the filtering control enabling unit is software-enabled on the computer system.

13. The method as claimed in claim 12 wherein the mode of the computer system can be detected by the software, according to which the filtering pin is set.

* * * * *